United States Patent

Hill et al.

[15] 3,643,059
[45] Feb. 15, 1972

[54] A METHOD OF WELDING TUBES TO TUBE PLATES

[72] Inventors: William G. Hill, London; Kenneth Stevens, Richmond, both of England

[73] Assignee: Foster Wheeler Corporation, Livingston, N.J.

[22] Filed: Apr. 21, 1970

[21] Appl. No.: 30,415

[52] U.S. Cl. ................................ 219/125 R, 219/60 R, 219/61
[51] Int. Cl. ......................................................... B23k 9/12
[58] Field of Search ................. 219/124, 125 R, 60, 60.1, 61

[56] References Cited

UNITED STATES PATENTS

| | | | |
|---|---|---|---|
| 1,508,713 | 9/1924 | Noble | 219/125 |
| 2,792,490 | 5/1957 | Risch et al. | 219/61 X |
| 2,908,805 | 10/1959 | Apblett et al. | 219/125 |
| 3,142,745 | 7/1964 | Gotch | 219/125 |
| 3,227,849 | 1/1966 | Thielsch | 219/61 |
| 3,345,494 | 10/1967 | Apblett, Jr. et al. | 219/125 |

Primary Examiner—R. F. Staubly
Assistant Examiner—L. A. Schutzman
Attorney—John Maier, III, Marvin A. Naigur and John E. Wilson

[57] ABSTRACT

This disclosure describes a method of an apparatus for seal welding. In order to allow for automatic welding a groove is provided around the bore in a tube plate, header or the like, and an annular filler ring is provided in this groove around the end of the tube to be seal welded to the tube plate, header or the like. According to this invention, automatic seal welding is effected in a time which is comparable with manual seal welding by temporarily fixing a spindle in the end of each tube. The spindle is expandable in diameter and by expanding it, it can be temporarily fixed in place. After fixing it in place, a welding head is fixed over the spindle and a seal weld made. While this welding is taking place, the operator can be fixing one or more spindles in place. After the weld is completed, the head is removed and placed on a new spindle to made a new seal weld. The spindle can then be removed and placed in the end of a fresh tube.

6 Claims, 1 Drawing Figure

PATENTED FEB 15 1972
3,643,059
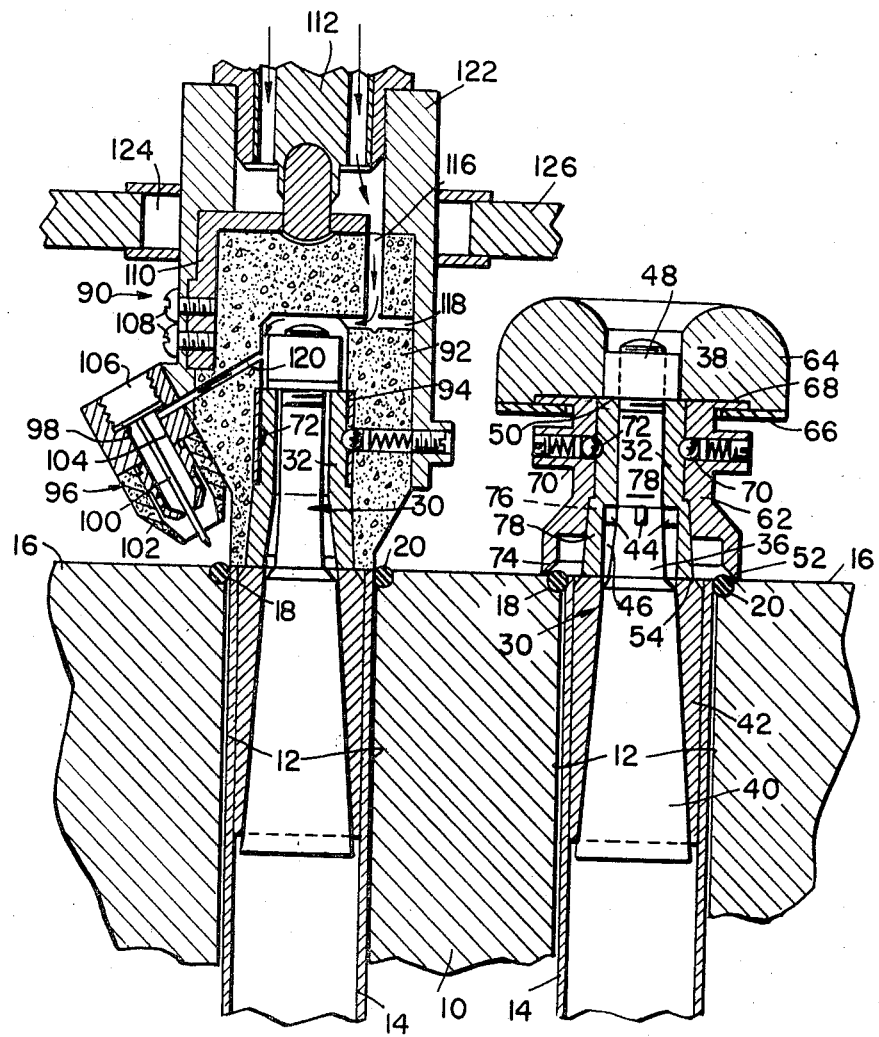
INVENTORS
WILLIAM G. HILL
KENNETH STEVENS

A METHOD OF WELDING TUBES TO TUBE PLATES

This invention relates to welding apparatus and is particularly concerned with apparatus for and a method of seal welding tubes to tube plates, headers and the like.

BACKGROUND TO THE INVENTION

In seal welding tubes, and particularly small bore tubes, to tube plates, it is essential to produce a joint which is well fused at the root, is smooth, crevice-free and projects to an equal depth into the tube wall all the way round the tube. It is these properties which an operator aims to produce when welding normally. Naturally, however, it is virtually impossible to achieve a completely uniform weld manually and it would, therefore, be desirable to have an automatic apparatus which gave excellent and uniform seal welds.

The usual problem of automatic apparatus is that, to achieve a good weld, an accurate uniform weld preparation is required and also it is quite a slow process to set up the apparatus, usually much slower per weld that can be achieved with manually made welds.

We have recently described in our copending U.K. Pat. application No. 9592/69 how by making a groove around the bore in the tube plate and fitting a filler ring in this groove so as to provide a reserve of material when melted, we can achieve extremely good and uniform seal welds even though there may be some slight inaccuracies in the alignment and sizes of the tube and bore in the plate.

Therefore the remaining problem is concerned with speeding up the setting of automatic welding apparatus so that welds can be achieved automatically in a time at least comparable with that which can be achieved manually and the invention is concerned with this problem.

THE INVENTION

According to the invention there is provided a method of making a seal weld between a tube and a tube plate, header or the like in which a spindle is inserted into the tube positioned in the bore of a hole through the tube plate, header or the like ready for seal welding to the tube plate, header or the like, the spindle being inserted by a predetermined amount so as to leave a part projecting from the tube, and the spindle having a radially expandable part which is inserted into the tube and is expanded to grip the inside of the tube and hold the spindle in place, and thereafter a welding head is rotatable fixed to the projecting part of the spindle, the predetermined amount by which the spindle is inserted into the tube being such that, once the welding head is fixed on the spindle, the electrode of that head is then correctly aligned and positioned to produce the seal weld.

Such a method of operation is simple and can be quick, in fact, sufficiently quick to rival the time of making the seal weld manually. The method is quick because the operator can be setting up one spindle while another welding operation is being made. The method can in fact be speeded up much more by carrying out say three welding operation at a time and while these welds are being made it is found that the operator will have time to set three new spindles in place and remove three spindles from previously welded tubes.

The setting of the spindles can easily be made an accurate and simple operation by using a suitable jig. Preferably the predetermined position is made in relation to the surface of the tube plate or the like so that the position is independent of the length of the tube and thus the amount by which it projects from the tube plate or the like, since this ensures that adequate penetration and fusing of the plate, header or the like occurs.

BRIEF DESCRIPTION OF THE DRAWING

The invention will now be illustrated, by way of example, with reference to the accompanying drawing which is a cross section showing the setting up of the welding apparatus being effected at one tube and the welding operation being made at another tube.

DESCRIPTION OF THE PREFERRED EMBODIMENT

The tube plate 10 shown in the drawing has a number of bores 12 through it and in each bore is positioned the end of one of a number of tubes 14. The tube plate surface 16 has been prepared by making annular grooves 18 around each bore 12 and in each of these grooves 18 is positioned a filler ring 20 which provides a reserve of melted material and so assists in giving a uniform seal weld. The use of such a filler ring 20 is described in our copending U.K. Pat. application No. 9592/69. In addition, the filler ring can be centered and held in position for welding by punching as is described in that application.

After the tubes 14 and tube plate have been prepared and assembled they are ready for making seal welds between the tubes and the plate. Firstly a spindle 30 is inserted into the tube and clamped in place.

The spindles 30 comprise an upper cylindrical bearing sleeve 32 and a lower expanding portion. The bearing sleeve 32 has a central bore in which is slidably fitted a core 36 which in turn comprises an upper rod 38 and an integral lower truncated conical part 40. Around the part 40 is an expandable sleeve 42 which has an inner conical surface fitted around the part 40 and which can, for example, have a single slit extending the whole axial length of the sleeve or a number of short slits spaced around the sleeve and extending part of the axial length of the sleeve. Thus, as the central core 36 is moved upwardly relatively to the sleeve 42, the sleeve is caused to expand in diameter and in this way can be made to grip the inside of the tube 14 so holding the spindle 30 in position.

The rod 38 has four spaced projecting lugs 44 which engage in grooves 46 in the bearing sleeve 32. In this way the core 36 is allowed to move axially relatively to the sleeve 32 but cannot rotate relatively to it. The upper end of the rod 38 is threaded and on this threading is fixed a nut 48. The nut also engages the upper face 50 of the sleeve 32 whose lower face 52 engages the upper face 54 of the sleeve 42. Thus, by rotating the nut 48, the part 40 can be drawn up within the sleeve 42 so causing it to expand and grip the tube 14.

The spindle 30 can be positioned in a tube by using a jig 60 as shown on the right-hand side of the drawing, This jig comprises a cylindrical body 62 which fits over the bearing sleeve 32 of the spindle and an upper rotatable handle 64. The latter has an inwardly directed annular flange 66 which fits over an outwardly directed annular flange 68 at the upper end of the body 62 so as to hold the two parts together while allowing them to rotate relatively to one another.

The handle 64 has a central hexagon-shaped hole which fits over and engages the nut 48 so that rotation of the handle rotates the nut.

The body 62 is provided with a number of spring-loaded balls 70. These snap into an annular recess 72 in the outer surfaces of the bearing sleeve when the jig 60 is engaged over a spindle 30. The lower end of the body 62 is in the form of an annular shirt 74 which engages the surface 16 of the tube plate. Thus, with the spindle 30 accurately positioned within the jig 60 by engaging the balls 70 in the recess 72 the spindle can be lowered into a tube 14 until the skirt 74 engages with the surface 16. The spindle will then be accurately positioned relatively to the surface 16 and independently of the upper end of the tube 14.

The body 62 also has inwardly directed lugs 76 which engages in slots 78 in the outer surface of the bearing sleeve 32 so that the jig can be fitted over the spindle but the body 62 and sleeve 32 can rotate relatively to one another when the handle 64 is turned. Thus, rotation of the handle will cause the sleeve 42 to expand.

Once a spindle 30 has been temporarily fitted in a tube 14 a welding head 90 can be fitted to it ready to make the welding operation.

The welding head comprises an insulating body 92 of, for example, boron nitride or talc having a central cylindrical bore 94 which fits over the bearing sleeve 32. The body 92 has a number of spring-loaded balls 94 which engages in the groove 72 in the bearing sleeve 32 and so locates the body positively relatively to the spindle. The body and whole welding head is free to rotate about the spindle, however.

Fixed to the body 92 is an electrode carrier 96 comprising an inner metallic sleeve 98 of, for example, copper surrounding a nonconsumable tungsten electrode needle 100 and a lower ceramic sleeve 103 shrouding the needle 100. A passage 104 is defined in the carrier 96 by the sleeves 98 and 102 and through this passage an inert shielding gas is passed so as to shield the arc region. The needle 100 is electrically fixed to the sleeve 98 by means of a metallic cap 106.

The electrode carrier is attached by screws 108 to a copper conducting member 110 which in turn is attached to the insulating body 92. Current is supplied to the member 110 from the core 112 of a lead 114. The latter also supplies the inert shielding gas which passes to the passage 104 in the electrode carrier through passages 116, 118 and 120 in the body 92. Surmounting the body 92 is an upper sleeve 122 to which the lead 114 is attached.

The welding head 90 can rotate freely about the spindle 30 and, so as to rotate it correctly during a welding operation so that the needle 100 is orbited around the tube 14, a toothed drive wheel 124 is fitted around the upper sleeve 122. This wheel 124 is driven from a drive (not shown) by means of a chain or notched drive belt 126. The drive (not shown) can be quite conventional and after fitting the welding head in place on a spindle, the belt 126 is fitted between the drive and the head.

As mentioned above, more that one, e.g., three, welding heads 90 can operate at any one time so as to make three seal welds concurrently. It is, therefore, convenient to transmit a common drive to them all so as to rotate them together by means of the belt 126.

The whole operation will, therefore, be as follows. Firstly the tube plate 10 will be prepared and set up with the tubes 14, and weld filler rings 18 as described above.

Then an operator will fit a spindle 30 in one of the tubes 14 by first fitting the spindle 30 in a jig 60 by engaging the sleeve 32 in the body 62 and ensuring that the balls 70 snap into the groove 72. Then, the lower end of the spindle is inserted into the tube until the skirt 74 engages the surface of the tube plate, the handle 64 is turned to expand the sleeve 42 until it grips the wall of the tube and holds the spindle rigidly in place. Thereafter the jig 60 can be removed by pulling off from the sleeve 32 leaving the spindle in place.

The operator will normally fit three spindle 30 in place in different tubes. Then he will fit a welding head 90 to each spindle and attach the belt 126 around the wheel 124 of each head and to the common drive. We can then initiate welding in the conventional way so that an arc is struck from the needle 100 and the heads are rotated as required to orbit the needles around the ends of the tubes. While this welding is going on, the operator can now fit three further spindles to three further tubes so as to prepare them for welding.

After completion of welding, the heads 90 are removed from the spindles 30 and fitted to three fresh spindles and further welds made. The spindles in the welded tubes are now free for removal and reuse by fitting the jig 60 over them and unscrewing the nut 48 to release the spindles. The jig 60 holding a spindle may now be inserted in a fresh tube.

As can be seen, the welding operation itself can be made entirely automatic and only need initiation by the operator, once he has set up the welding apparatus. This setting up is a very simple job and is completely accurate when using the jig 60 since the spindles are always inserted the correct amount into the tube relatively to the top surface 16 of the tube plate so that the needle 100 is always correctly positioned. In addition the act of setting up is quite quick and since setting up for one or more tubes can be made while other tubes are being welded automatically ensures that the operator does not have to waste time. In fact by welding three tubes at a time, the operator can remove three spindles from welded tubes and set these in fresh tubes while the three tubes are being welded, and then the overall time per tube will be less than that which could be achieved by the operator manually welding each tube. In addition the automatic welding process ensures the production of accurate uniform welds.

A lattitude of change, modification and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

We claim:

1. A method of making a seal weld between a tube and a tube sheet, header or the like comprising the steps of:
   a. inserting one end of a spindle into a jig a given amount so that the other end protrudes a predetermined distance,
   b. placing the jig on a tube sheet header or the like so that the other end of said spindle projects down into the tube said predetermined distance,
   c. expanding the other end of said spindle to hold it in place in said tube,
   d. removing said jig from said spindle,
   e. rotatably fixing a welding head over said one end of said spindle, said head including an electrode, said predetermined distance by which said spindle is inserted into said tube being such that, when said welding head is fixed on said spindle, said electrode is correctly aligned and positioned to produce said seal weld,
   f. making said seal weld,
   g. removing said welding head from said spindle, and
   h. removing said spindle by radially contracting the expanded part of said spindle and withdrawing it from said tube.

2. A method according to claim 1 in which said predetermined amount is measured from the surface of said tube sheet, header or the like.

3. A method according to claim 1 in which said jig has an annular skirt which contacts said surface of said tube plate, header or the like around the outside of said tube when said spindle has been inserted by said predetermined amount.

4. A method according to claim 3, in which said jig is provided with means for expanding said radially expandable part of said spindle while said spindle is held by said jig.

5. A method according to claim 1 in which said projecting part of said spindle has a substantially cylindrical bearing surface and an annular groove is provided in the periphery of said bearing surface transversely of the axis of said spindle, said welding head being provided with a cylindrical bearing ring which mates with said said bearing surface to rotatably support said welding head, said welding head having a number of resiliently mounted balls which are snap fit into said groove when said head is correctly positioned on said spindle.

6. A method according to claim 1 in which an annular recess is provided in said surface of said tube sheet, header or the like around said bore, and a filler wire is positioned within said recess, said filler wire being fused during welding and becoming incorporated into said seal weld.

* * * * *